(12) United States Patent
Brandt, Jr.

(10) Patent No.: US 7,228,750 B2
(45) Date of Patent: Jun. 12, 2007

(54) APPARATUS AND METHOD FOR MEASURING FLUID FLOW

(76) Inventor: Robert O. Brandt, Jr., 516 Landmark Dr., Wilmington, NC (US) 28412

( * ) Notice: Subject to any disclaimer, the term of this patent is extended or adjusted under 35 U.S.C. 154(b) by 0 days.

(21) Appl. No.: 11/181,174

(22) Filed: Jul. 14, 2005

(65) Prior Publication Data

US 2005/0241413 A1    Nov. 3, 2005

Related U.S. Application Data

(63) Continuation-in-part of application No. 10/428,735, filed on May 2, 2003, now abandoned, which is a continuation-in-part of application No. 09/873,081, filed on Jun. 1, 2001, now abandoned.

(51) Int. Cl.
  *G01F 1/44* (2006.01)
  *G01F 1/46* (2006.01)
(52) U.S. Cl. .............................. 73/861.63; 73/861.65
(58) Field of Classification Search .................... None
  See application file for complete search history.

*Primary Examiner*—Harshad Patel
(74) *Attorney, Agent, or Firm*—Robert G. Rosenthal

(57) ABSTRACT

A method and apparatus for fluid flow straightening and measurement introduces a high beta nozzle or venturi in-line with existing conduit. A fluid velocity measuring device is positioned in the throat of the high beta nozzle and measurements of velocity at multiple points in a plane perpendicular to the direction of fluid flow are taken. The velocity data points are then averaged and produce an output signal from which fluid flow rate can be determined.

20 Claims, 17 Drawing Sheets

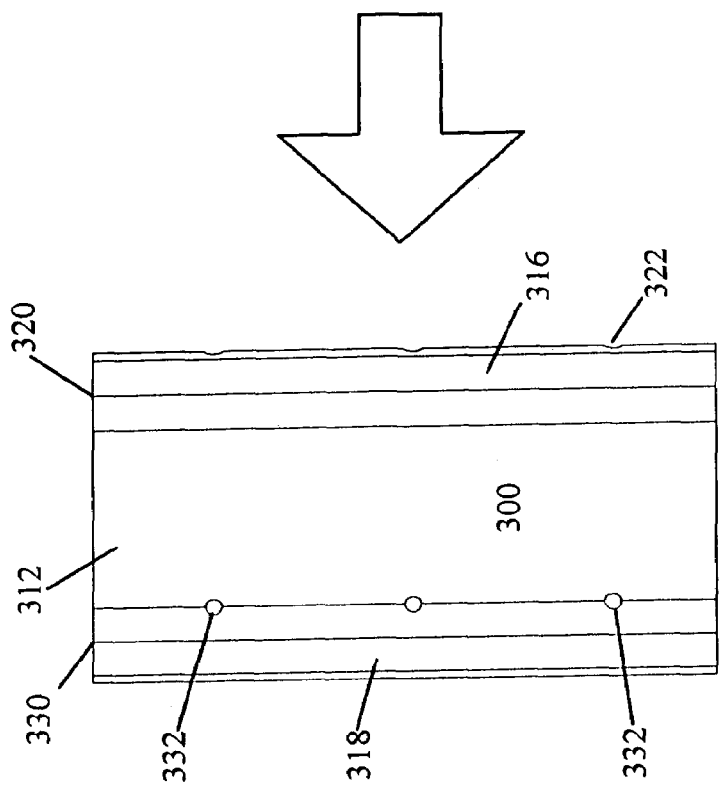
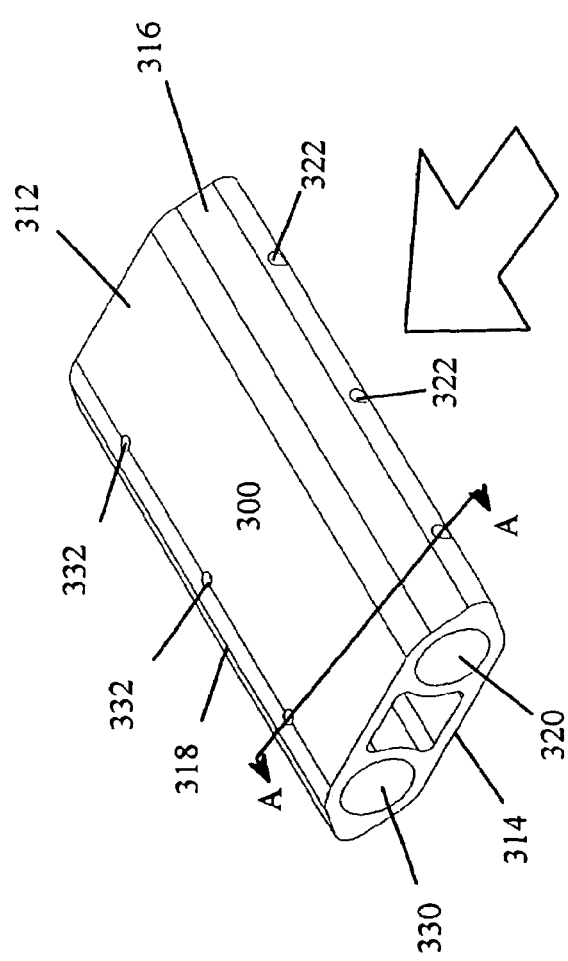
FIGURE 14
FIGURE 13

APPARATUS AND METHOD FOR MEASURING FLUID FLOW

REFERENCE TO RELATED APPLICATION

This application is a continuation-in-part of U.S. patent application Ser. No. 10/428,735 filed May 2, 2003 now abandoned which is a continuation-in-part of U.S. patent application Ser. No. 09/873,081 filed Jun. 1, 2001, now abandoned.

FIELD OF THE INVENTION

This invention relates generally to the field of fluid flow measurement and more particularly, to a fluid flow straightening apparatus and an apparatus for measuring the fluid flow therein.

BACKGROUND OF THE INVENTION

Many industries require large quantities of air or other fluids to be moved as part of their processes. For example, in the electric power generation industry, pulverized coal and air are moved through conduits (ductwork) which can be as large as eight feet in diameter towards a furnace in which combustion occurs. Maintaining the proper coal/air ratio is important in order to optimize the amount of power generated but also to minimize the amount of pollutants that are created as a by-product of said combustion. However, as is well-known to those skilled in the art, the conduit, especially as it nears the furnace, is rarely straight for distances which are long enough to afford accurate measurements using conventional techniques.

The measurement of fluid flow in non-linear ductwork is a well-known problem. This is due to the fact that when a fluid (such as air) is directed around a corner, fluid flow is disturbed and a portion of the fluid is actually flowing in the reverse direction. This is especially true at or near a take off point (a split in the conduit). The aforementioned reversal continues for approximately four to seven conduit diameters.

In the prior art, nozzle pitots have been installed in a nozzle positioned in the conduit in an attempt to measure fluid flow. Unfortunately, the diameter of the nozzle is such that the volume of fluid is substantially reduced which causes a pressure loss across the nozzle. For example, given an eight foot diameter conduit having an air flow rate of 4000 feet/min. generates 5 inches of water pressure with a 1000 hp fan. If the nozzle doubles the pressure, then a 2000 hp fan is required in order to maintain the same air flow rate. Another method of measuring air flow is to locate a honeycomb type structure in the conduit in order to straighten the fluid flow prior to measurement by a conventional pitot. This method also suffers from a pressure drop and additionally, the honeycombs tend to become clogged, which further degrades performance.

Thus, it will be seen that unrecovered pressure losses result in system losses in the form of heat or decreased system efficiency.

In view of the foregoing, it would be of great commercial value to provide an improved fluid flow measurement apparatus.

Accordingly, it is an object of the present invention to provide an improved fluid flow measurement apparatus.

Another object of the present invention is to provide an improved fluid flow measurement apparatus which operates in short conduit sections.

A further object of the present invention is to provide an improved fluid flow measurement apparatus which acts to straighten fluid flow.

A still further object of the present invention is to provide an improved fluid flow measurement apparatus which minimizes pressure drop.

Yet another object of the present invention is to provide an improved fluid flow measurement apparatus which is inexpensive.

An additional object of the present invention is to provide an improved fluid flow measurement apparatus which is accurate.

SUMMARY OF THE INVENTION

The benefits and advantages of the present invention are achieved by providing an apparatus for measuring fluid flow which is adapted to be connected in-line with existing conduit and being characterized by the ability to accurately measure fluid flow with low unrecovered pressure loss. A high beta nozzle or venturi is positioned in-line with the conduit and has a converging inlet end, a throat of substantially constant diameter. In the case of a venturi, a diverging outlet end. A first means for measuring velocity, such as a parallel plate pitot is constructed and arranged to measure the velocity at a plurality of locations across the cross-section of the throat and to output a signal representative thereof.

BRIEF DESCRIPTION OF THE DRAWINGS

Some of the features and advantages of the invention having been briefly stated, others will appear from the detailed description which follows, when taken in connection with the accompanying drawings, in which

FIG. 13 is a is a perspective view of a section of the pitot according to the present invention.

FIG. 14 is a plan view of a section of the pitot according to the present invention.

DETAILED DESCRIPTION OF THE ILLUSTRATED EMBODIMENTS

While the present invention will be described more fully hereinafter with reference to the accompanying drawings, in which particular embodiment are shown, it is to be understood at the outset that persons skilled in the art may modify the invention herein described while still achieving the favorable results of this invention. Accordingly, it is to be understood as a broad teaching disclosure directed to persons of skill in the appropriate art and not as limiting upon the present invention.

Figure 2:
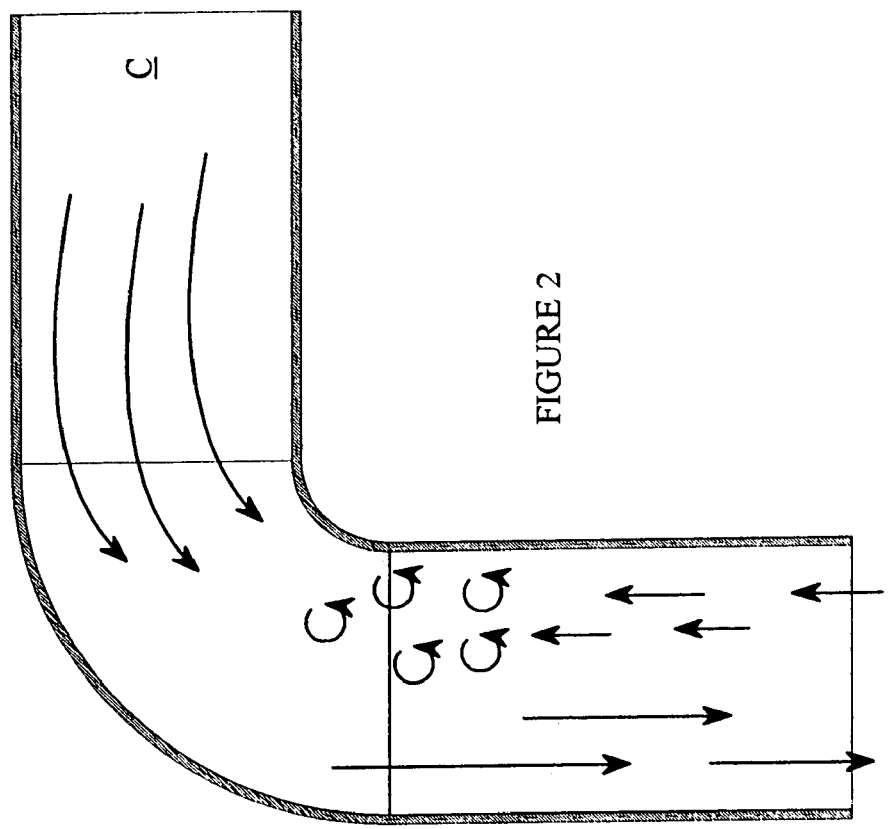
FIG. 2 is a cross-sectional view of a conduit showing an elbow and the reverse fluid vectors associated with a turn.
Figure 1:
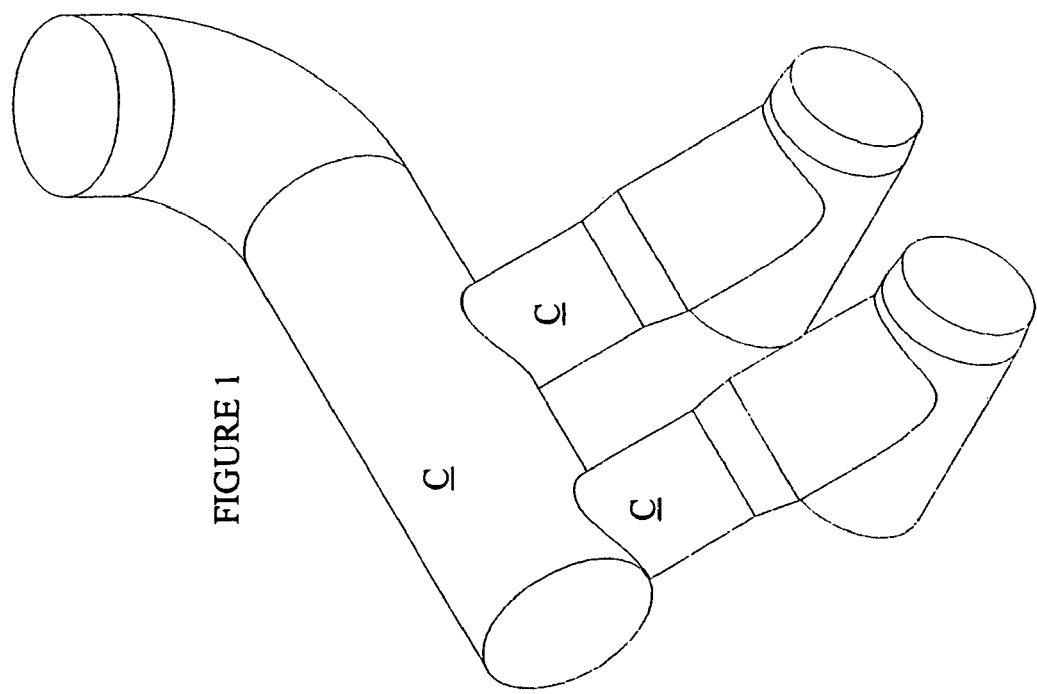
FIG. 1 is a perspective view of conduit showing a main duct with two branches extending therefrom.
Figure 2B:
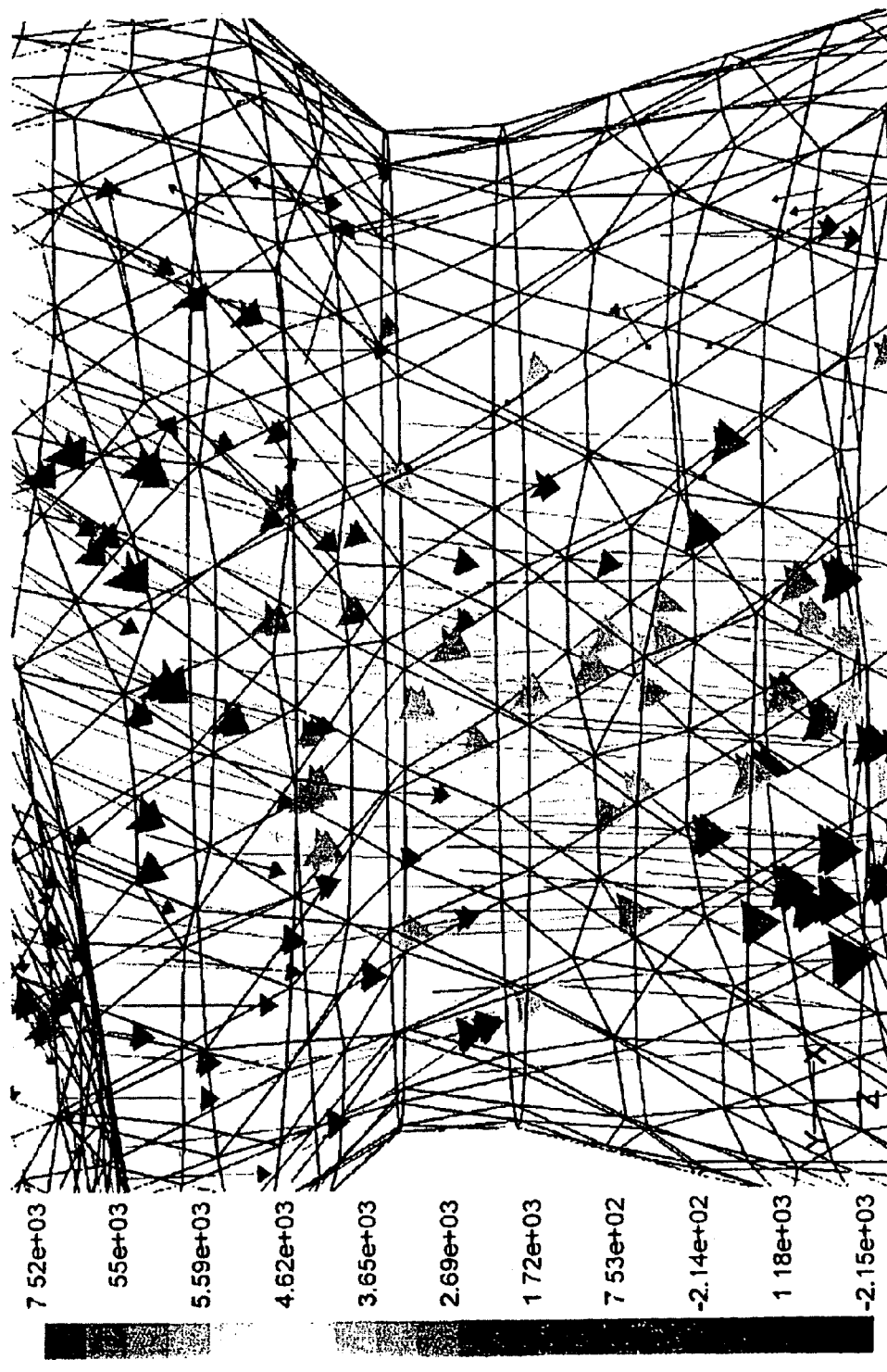
FIG. 2b illustrates the straightening of the velocity vectors according to the present invention.

Referring now to the drawings and specifically to FIGS. 1 through 5, which illustrate generally ductwork or conduit as would find application with the present invention. FIG. 1 shows a section of a large conduit from which a pair of smaller pipes extend. This type of conduit is typical of that which would be used in many industrial processes such as in electric power plants to move air and/or pulverized coal into a furnace. It is well known that when fluid moves around a bend that reverse currents or eddy currents result. This phenomenon is also illustrated in the computer model of FIG. 2b wherein the velocity vectors are shown. As briefly stated above, reverse currents degrade system performance. The foregoing may fairly be considered the current state of the prior art.

In accordance with the present invention there is provided an apparatus for measuring fluid flow. As illustrated in the figures, the apparatus is adapted to be connected in-line with existing conduit and is characterized by its ability to accurately measure fluid flow with low unrecovered pressure loss. The apparatus includes a venturi 100 and a means 300 for measuring the fluid velocity. While the drawings and the discussion that follows are directed a "venturi", it will be understood that the fluid flow straightening and measurement improvements of the present invention are also derived with the use of a "high beta nozzle" which is similar to a venturi except that the exit end does not diverge. The high beta nozzle has a slightly higher pressure loss than a venturi. Despite the pressure loss associated with high beta nozzles, they are quite often useful, especially near the end of a run of conduit, for example, where conduit enters a furnace.

Figure 4:
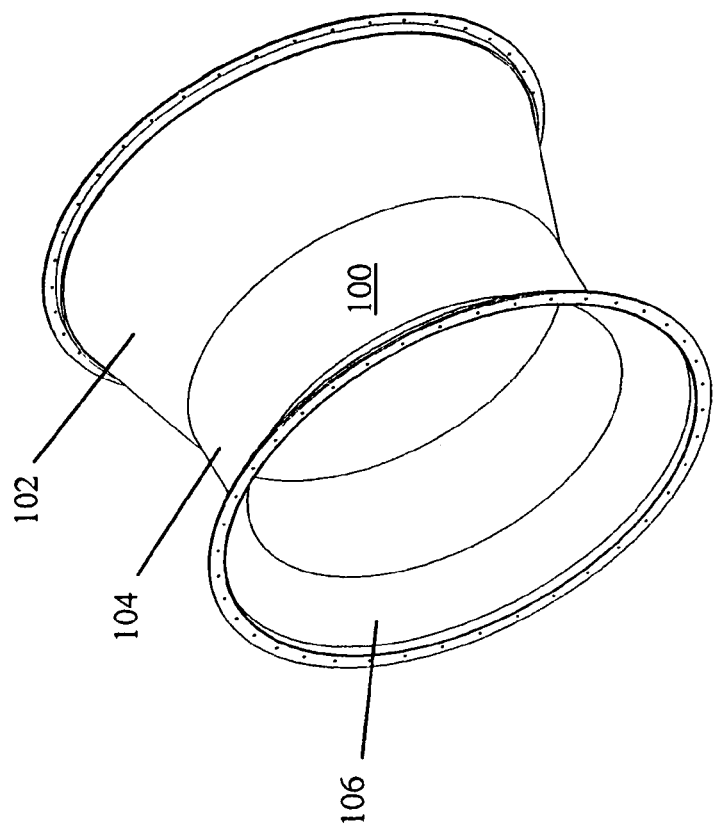
FIG. 4 is a perspective view of a venturi according to the present invention.
Figure 3:
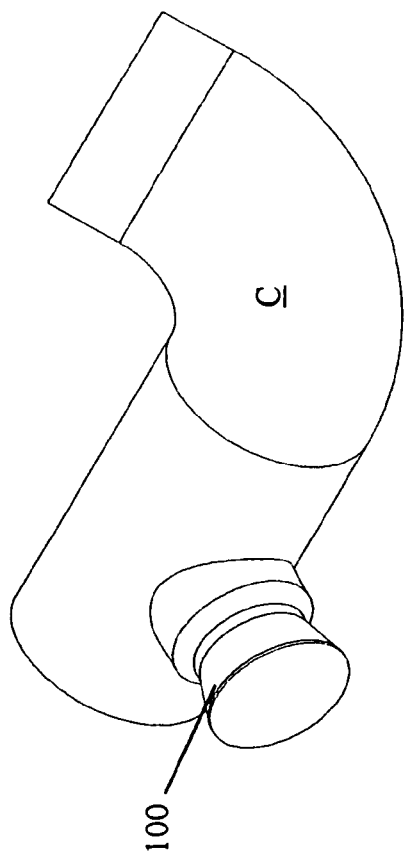
FIG. 3 is a perspective view of a conduit having a take-off with a venturi connected thereto according to the present invention.
Figure 5:
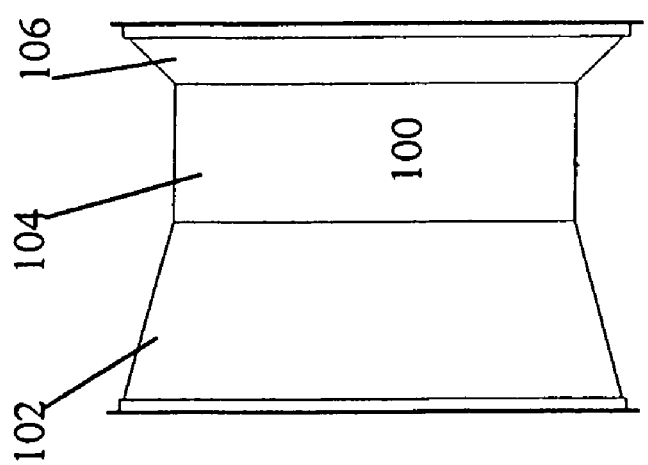
FIG. 5 is a side view of a venturi according to the present invention.
Figure 9:
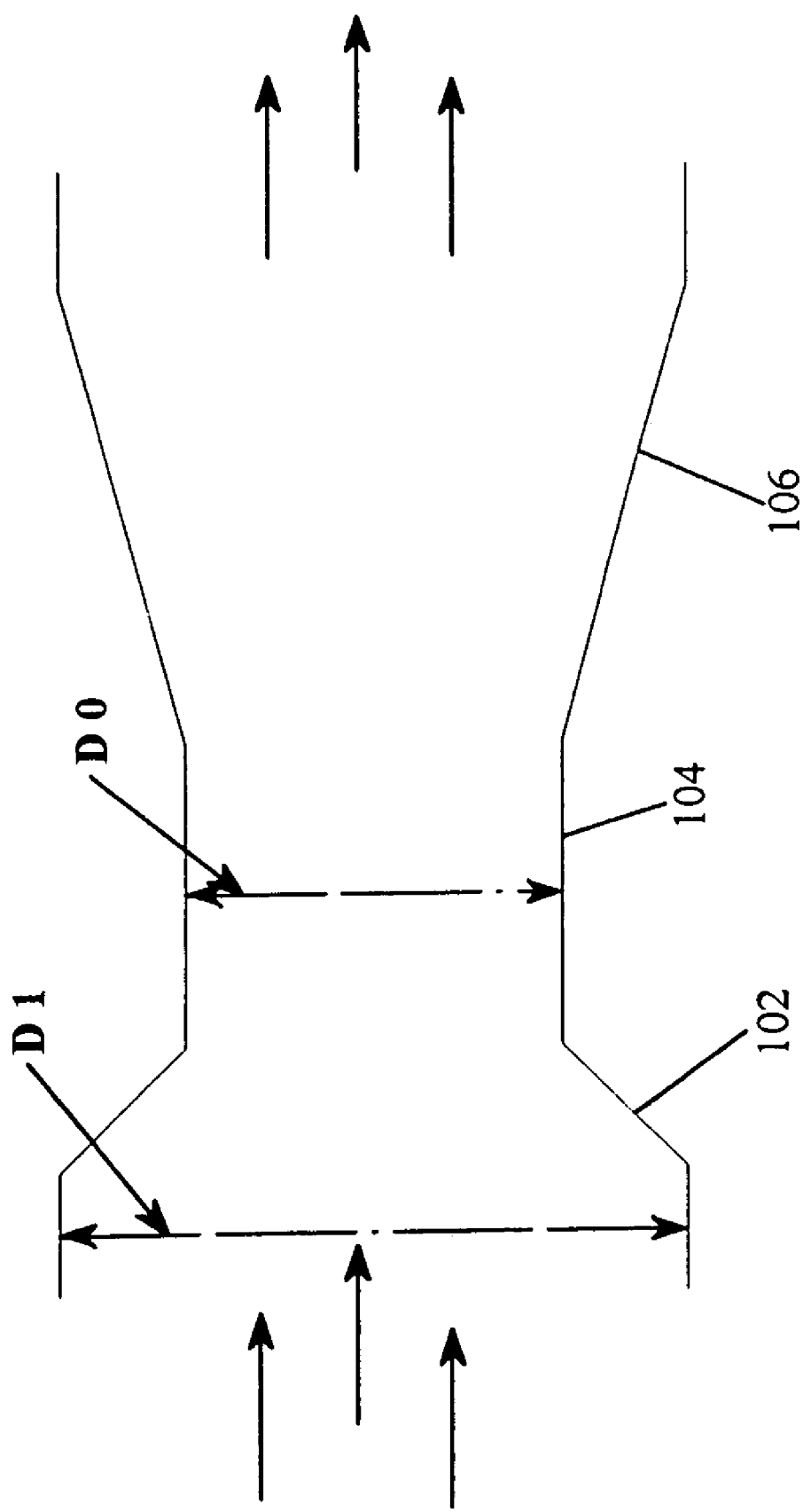
FIG. 9 is a cross-sectional view of a venturi and illustrating the method of determining a beta ratio.

The venturi 100 is inserted in the fluid flow path and is best illustrated in FIGS. 3 through 5 in which the direction of fluid flow is indicated by the arrows. More specifically, the venturi 100 as defined herein has (when taken in the direction of fluid flow) a converging section 102, a throat of substantially constant diameter 104 and a diverging section 106. The venturi 100 is manufactured from any material compatible with the flow stream, and preferably the same material as the rest of the conduit and is connected via any conventional compatible means such as welding, screws, etc. As referred to herein the term 'beta ratio' is defined as the ratio of the throat diameter D0 to the diameter D1 of the conduit immediately upstream as best shown in FIG. 9. More specifically, the Beta ratio=D0/D1. Computer modeling and experiments have shown that, when the beta ratio is between about 0.9 and about 0.6, reverse currents and eddy currents in the fluid flow stream are substantially eliminated or at least minimized to the point where an accurate measurement of fluid velocity can be made, as will be more fully explained herein below. As stated above, the high beta nozzle differs from the venturi in that diverging section 106 is straight.

Figure 10C:
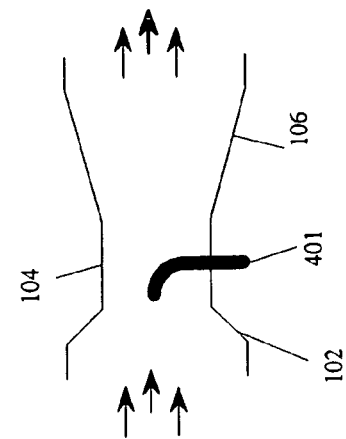
FIG. 10c is a cross-sectional view of a venturi according to the present invention and illustrating the use of a pitot in measuring fluid velocity.
Figure 10F:
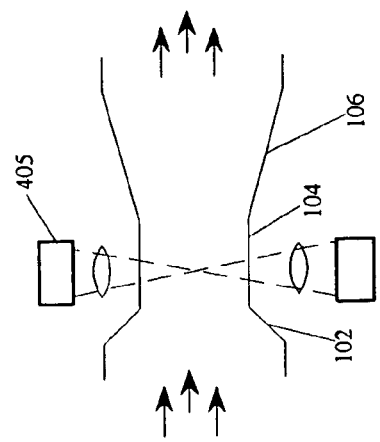
FIG. 10f is a cross-sectional view of a laser according to the present invention and illustrating the use of laser beams in measuring fluid velocity.
Figure 10B:
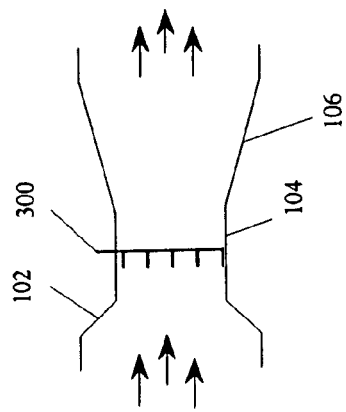
FIG. 10b is a cross-sectional view of a venturi according to the present invention and illustrating the use of an averaging pitot in measuring fluid velocity.
Figure 10E:
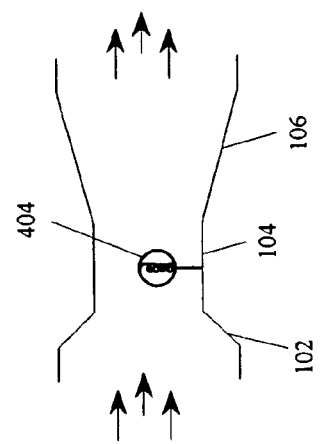
FIG. 10e is a cross-sectional view of a venturi according to the present invention and illustrating the use of an anemometer in measuring fluid velocity.
Figure 10A:
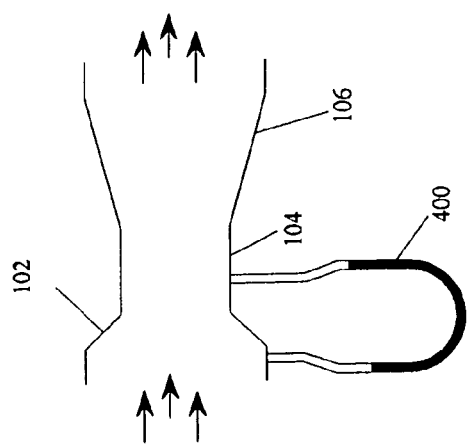
FIG. 10a is a cross-sectional view of a venturi according to the present invention and illustrating the use of a manometer in measuring fluid velocity.
Figure 10D:
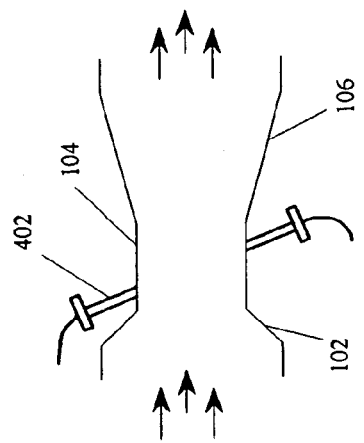
FIG. 10d is a cross-sectional view of a venturi according to the present invention and illustrating the use of ultrasonic sensors in measuring fluid velocity.

Once the fluid flow stream has been straightened, velocity measurements are taken. A first means 300 for measuring the velocity across the venturi throat is constructed and arranged to measure the velocity at a plurality of locations across the cross-section of the throat and to output a signal representative thereof. A variety of devices can be employed for such purpose, among them are the manometer (FIG. 10a), the velocity averaging pitot (FIG. 10b), the pitot (FIG. 10C), ultrasonic sensors (FIG. 10d), the anemanometer (FIG. 10e) or a laser (FIG. 10f). Depending on the means for measuring chosen the output signal may be a function of the square root of the velocity (as in $P=kV^2$, where P=pressure, k=a constant and V=velocity) or a linear function of the velocity (such as when an anemometer is used). Although only one of each device is illustrated in FIGS. 10a through 10f, it will be understood, that a plurality may be employed and the respective output signals from each averaged, to obtain an average velocity across the conduit.

Figure 6:
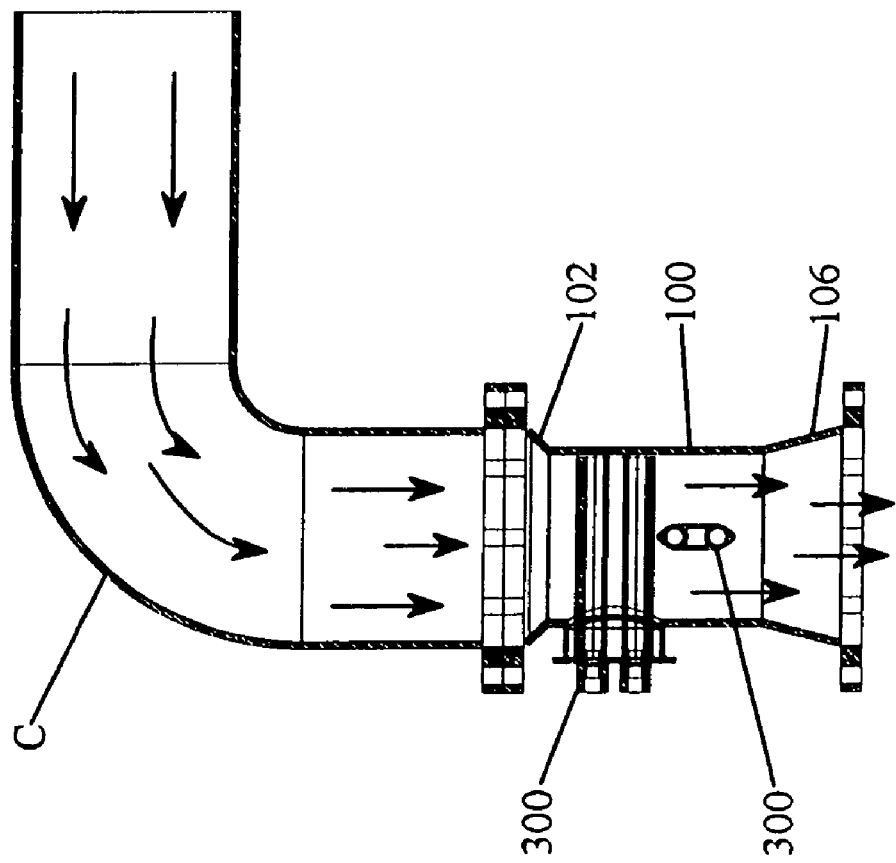
FIG. 6 is a cross-sectional view of a conduit having a venturi according to the present invention in-line therewith and showing the unidirectional fluid vectors.
Figure 7:
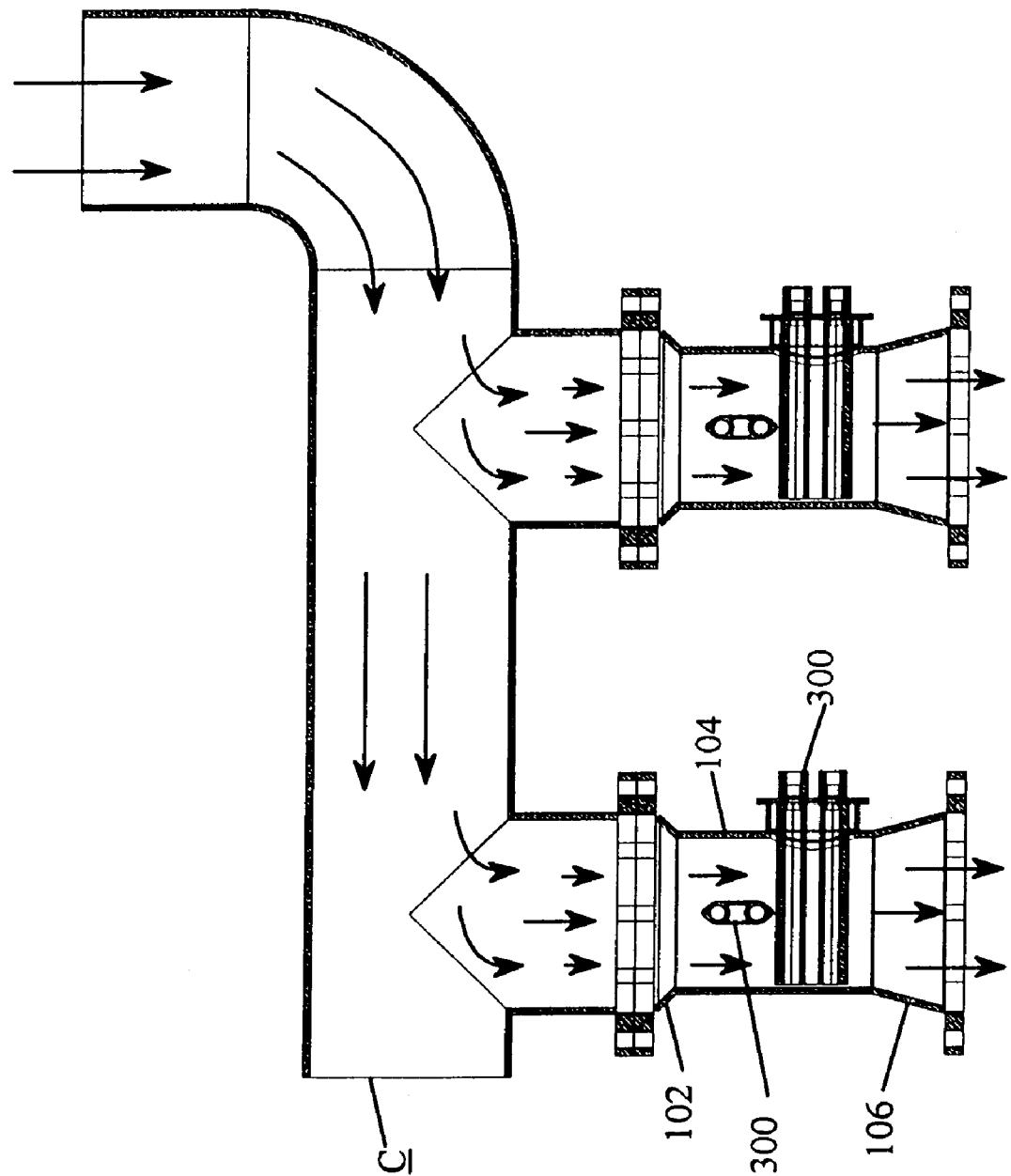
FIG. 7 is a cross-sectional view of a conduit having a pair of take-offs, each including a venturi, showing the unidirectional fluid vectors and the parallel plate pitots positioned therein.
Figure 8:
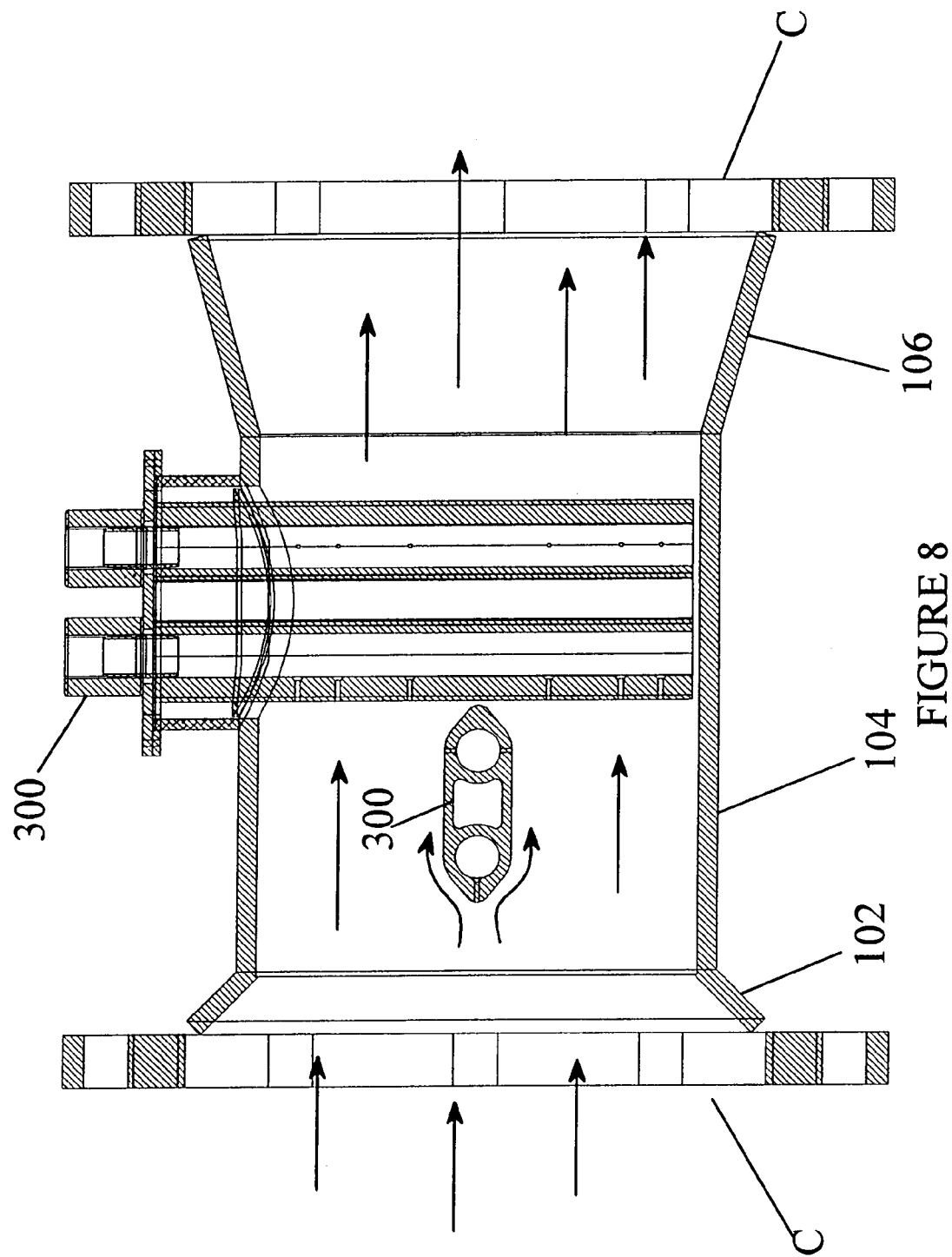
FIG. 8 is a cross-sectional view of a venturi showing in detail, the location of the parallel plate pitots according to the present invention.

Notwithstanding the foregoing, the preferred embodiment according to the present invention is to employ one or more parallel plate pitots. As best shown in FIGS. 6 through 8 a pair of parallel plate pitots are arranged at 90 degrees to one another across the diameter of the throat. The parallel plate pitots such as are employed herein are fully disclosed in U.S. Pat. No. 5,753,825 and is commercially available from Eastern Instrument Laboratories, Inc. of Wilmington, N.C.

The parallel plate pitots are positioned in the plane substantially perpendicular to the plane of fluid flow and are offset from each other relative to the direction of fluid flow.

Figure 16:
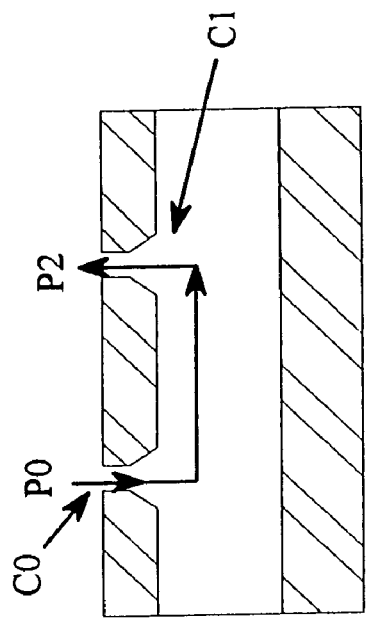
FIG. 16 is a cross section of one chamber of the pitot according to the present invention and illustrating the cone-shaped total pressure openings in the pitot.
Figure 15:
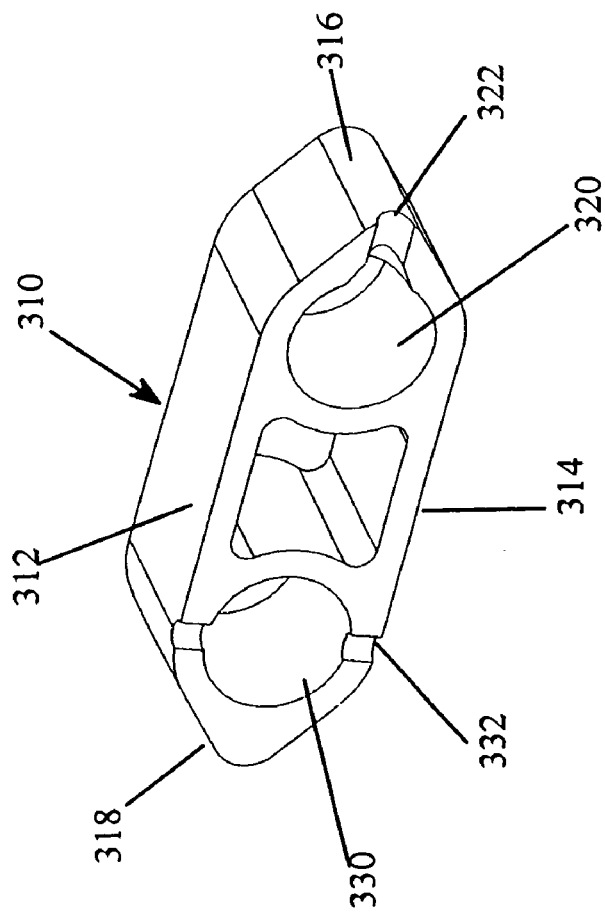
FIG. 15 is a sectional perspective view taken along line A-A of FIG. 13 of the pitot according to the present invention.

The pitot 300 comprises an elongate, substantially symmetrical wing-like structure that is of sufficient length to extent across the fluid flow stream or vent into which it is inserted. In practice, the pitot 300 is inserted transverse to the direction of flow of the fluid flow stream, generally indicated in the figures as an arrow(s). The pitot 300 has an upper surface 312 and a lower surface 314 both of which are substantially parallel and flat. At the upstream or leading edge 316 (as referenced with respect to that portion of the pitot which comes into contact with the fluid flow stream first) of the pitot 300 is a curved surface that connects the upper and lower surfaces 312, 314, respectively. Similarly, at the downstream or trailing edge 318 is a second curved surface (as referenced with respect to that portion of the pitot which comes into contact with the fluid flow steam last) that connects the upper and lower surfaces 312, 314, respectively. A first chamber or tube 320 is formed within the wing-like structure proximate the leading edge thereof also transverse to the fluid flow direction and extends along its length. A plurality of spaced apart total pressure measuring holes or ports 322 extend through the leading edge 316 in the fluid flow direction. As best illustrated in FIGS. 15 and 16 the total pressure measuring holes 322 are chamfered or are "funnel shaped" such that their inner diameter is greater than their outer diameter (the inner diameter being proximate tube 320 and the outer diameter being proximate port 322). In addition, the ends of tube 320 are provided with end caps or outlet ports (not shown).

A second chamber or tube 330 is formed within the wing-like structure proximate the trailing edge thereof also transverse to the fluid flow direction and extends along the length of the wing-like structure. A plurality of spaced apart static pressure measuring holes or ports 332 extend through the trailing edge perpendicular to the fluid flow direction. As best illustrated in FIG. 15, the static pressure measuring holes are of uniform diameter along their length. In addition, the ends of tube 330 are provided with end caps or outlet ports (not shown).

It will be noted that in the figures, the total pressure measurement holes have been modified, the invention will operate just as well when the geometries of the static and total pressure holes is reversed.

In the typical averaging pitot of the prior art, the probe measures pressure, not velocity. In order to be able to average the velocity of two or more points, first one must take the square root of the individual pressure readings and then average these values. Failure to take the square root of the individual pressure readings will result in considerable measurement error.

Figure 17:
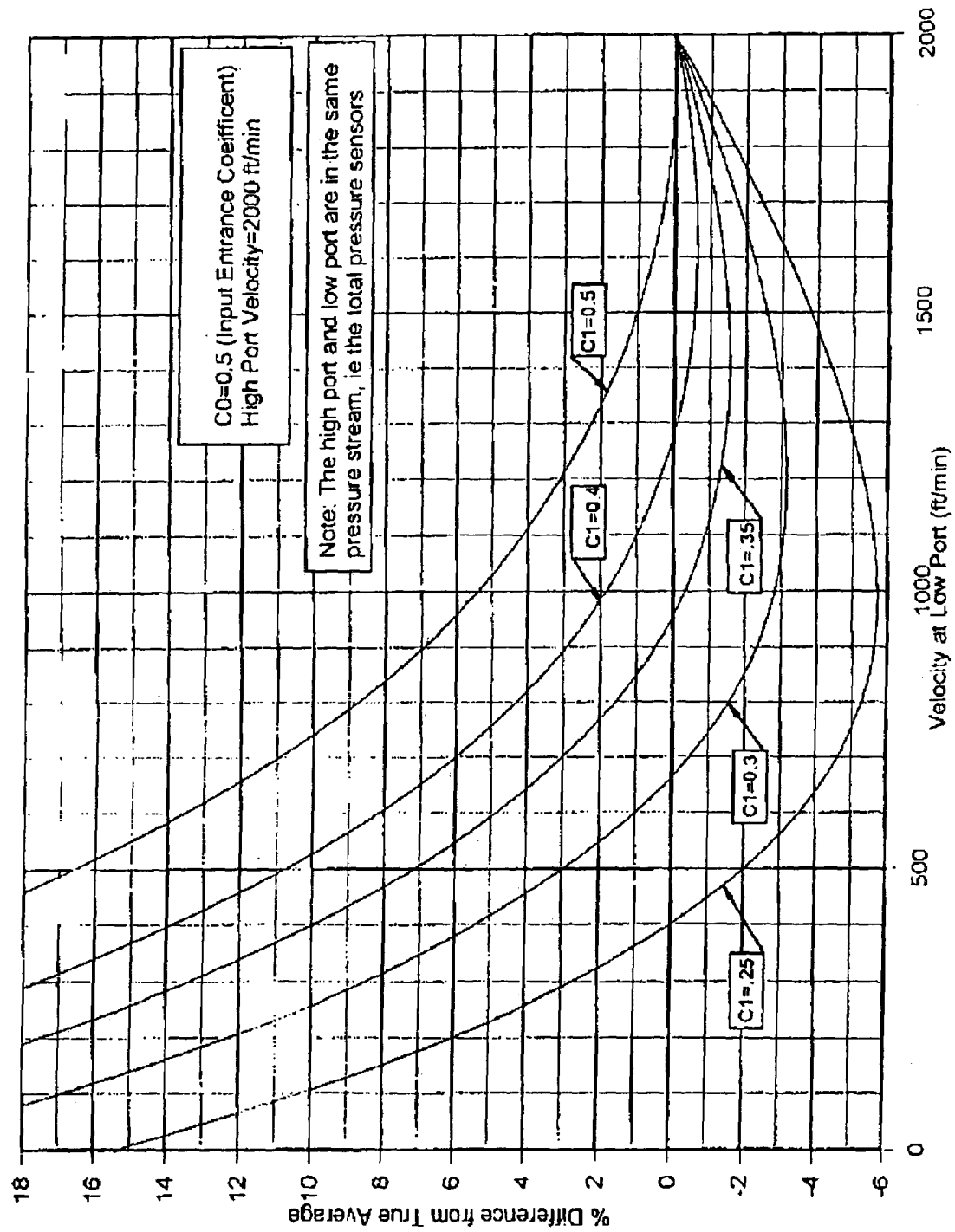
FIG. 17 is a graph illustrating the averaging error versus velocity differential for different discharge entrance coefficients.
Figure 18:
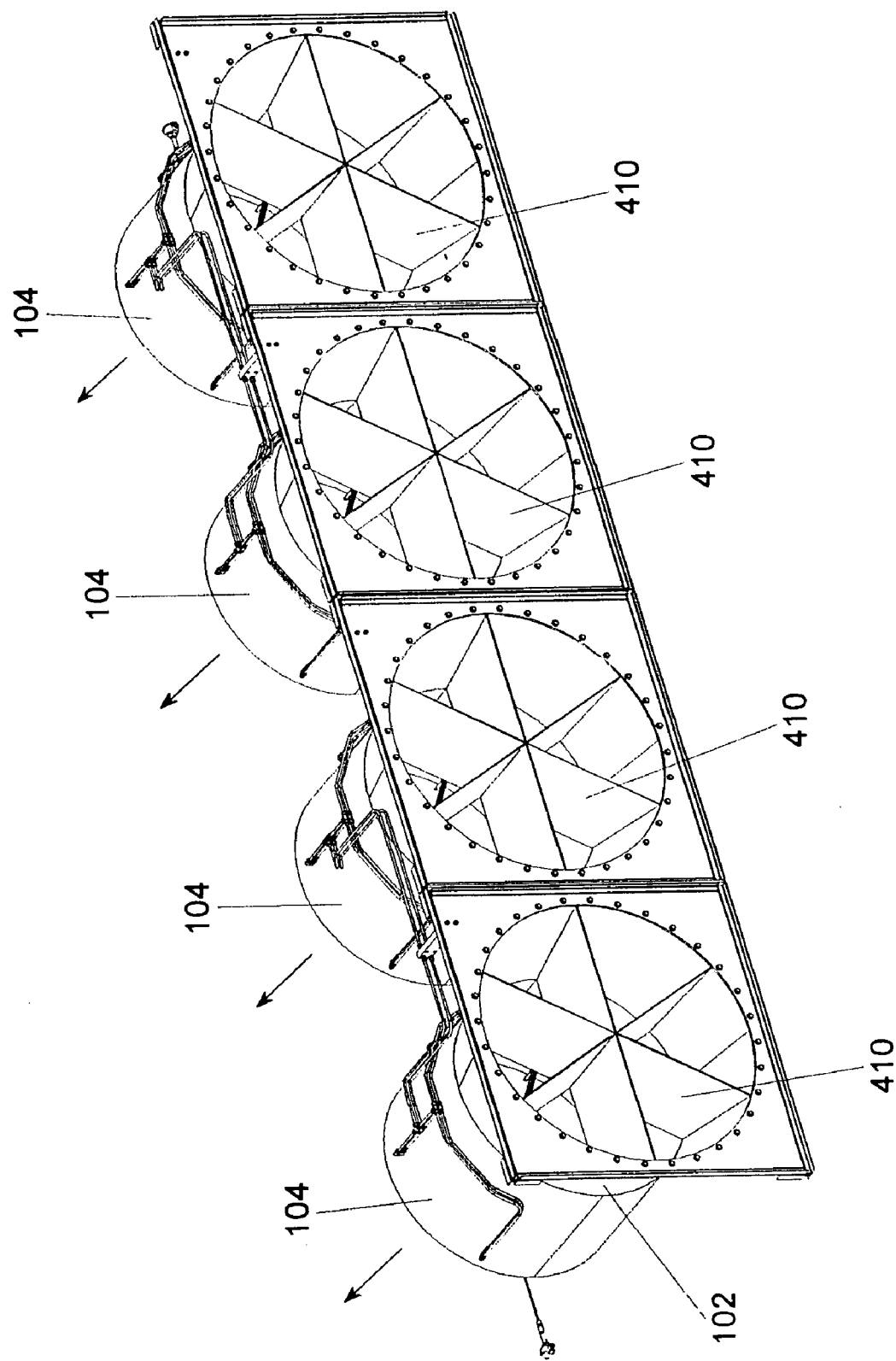
FIG. 18 is a front perspective view of a plurality of nozzles according to an alternate embodiment of the present invention positioned in a duct.
Figure 19:
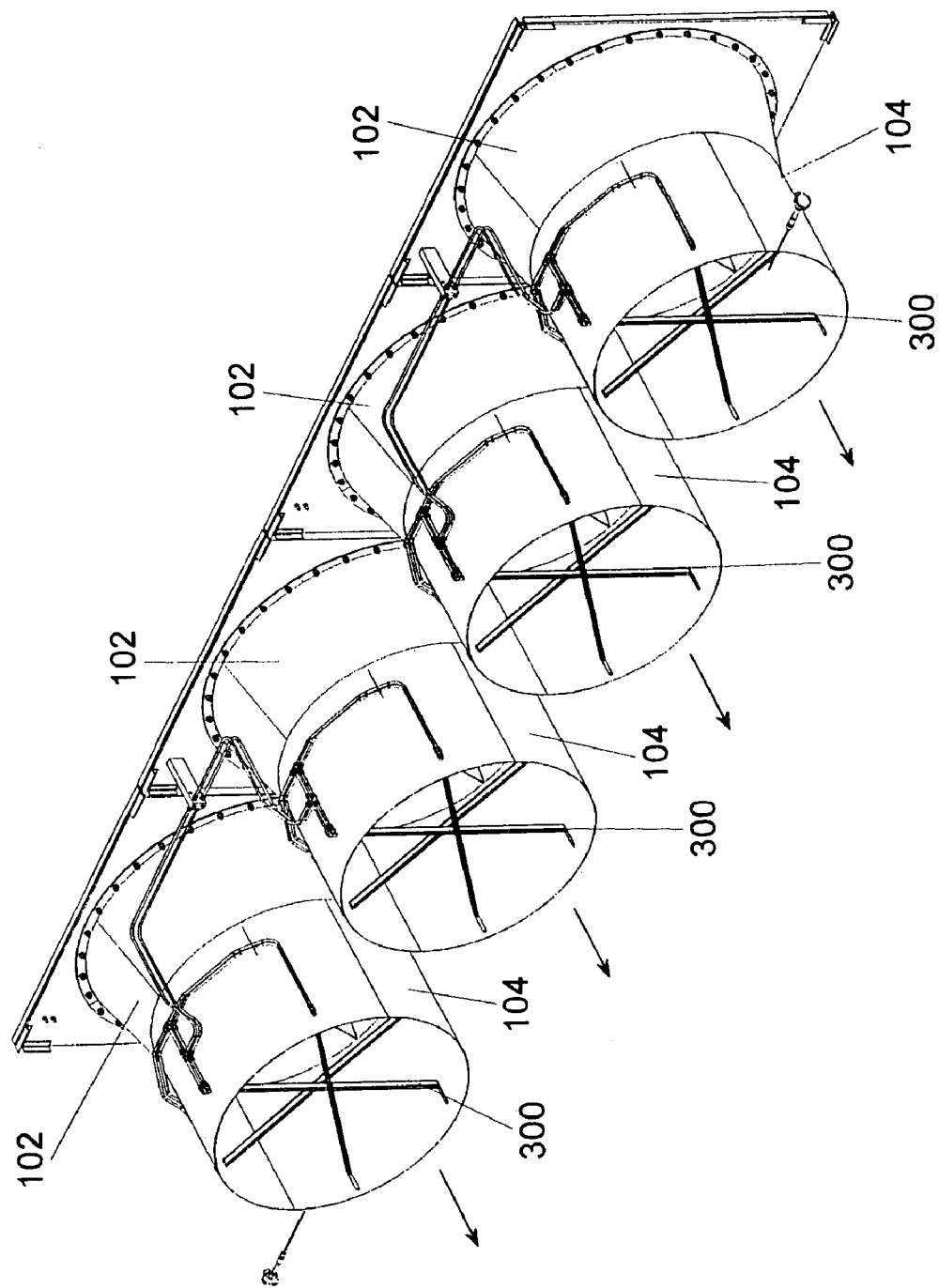
FIG. 19 is a rear perspective view of a plurality of nozzles according to an alternate embodiment of the present invention positioned in a duct.

The graph of FIG. 17 illustrates the error due to pressure averaging. The line indicated by C1=0.5 is the line which shows the pressure averaging error. This is because both entrance coeffieicnts are the same, namely, 0.5. As used herein the term "entrance coefficient" describes modifying the manner in which a particular port is shaped and not the direction of flow through the port. In the given example, an entrance coefficient of 0.50 means that there has been no modification to the port and that it is merely a cylindrical sharp edged drill hole (i.e., the static pressure hole 332 of FIG. 15). Values smaller than 0.50 indicate that the port has been shaped to cause the fluid flow to encounter less resistance to fluid flow from the shaped side (i.e., the funnel shaped portion of the port). FIG. 17 therefore clearly indicates that at C1=0.5 that averaging errors are always high.

However, if one were to change the entrance coefficient so that the discharge coefficient were always lower, then one would start reducing this error.

Referring again to FIG. 17, with C1=0.35, the error ranges between about 1.5% negative to about 1.5% positive for a velocity range of 2000 feet/minute to 800 feet/minute. Since the errors are opposite, they tend to cancel on another. In the same range, the error of the pitot with the same coefficient on both sides is about 1.5% by about 1400 feet/minute and by 800 feet/minute the error approaches 9%. These errors are all positive so they do not cancel each other out. The foregoing may be expressed mathematically as follows:

$$P0-P1=C0 \times Pvel$$

$$P1-P2=C1 \times Pvel$$

Solving for P1, where Pvel is the throat velocity of the sensing hole and is the same for both holes $$P1 = \frac{C1P0 + C0P2}{C1 + C0}$$

where P0 and P2 are velocity pressures represented the velocities in FIG. 17.

While the improved pitot design of the present invention permits greater design flexibility and measurement of the fluid flow stream with greater accuracy, the upper and lower surfaces 312, 314 should be parallel and of equal size. Similarly, tubes 320, 330 should also be parallel and of equal diameter. With respect to more detailed design criteria, the pitot 300 should extend across the entire flow stream. Two other dimensions are also important. First, the distance between tubes 320, 330 should be at least about four and preferably eight to ten times the tube diameter and second, the plate depth (the distance between tubes) should be at least one-half the duct diameter. For example, assume the pitot is to be placed across a ten inch diameter duct. Thus, the distance between tubes 320, 330 should be at least five inches. Also, as stated, the ratio between the tube diameter and the plate length is preferably eight to ten times the tube diameter, thus making the tube diameter between about 0.625 and 0.50 inches. In addition, the ratio of pitot frontal area should be greater than five percent and less than fifty percent of the cross sectional area of the duct (or airfoil) into which it is placed and for most applications would be about ten percent for accurate performance because when the flow is channeled into a more known pattern, by restricting the cross-sectional area of flow, the velocity of the flow stream becomes more predictable.

In operation, the pitot 300 is enclosed by appropriate means within the duct. A fluid flow passes over the pitot and at one end of the first tube 322, the total pressure reading is taken and at one end of the second tube 332, the static pressure reading is taken. The foregoing outputs are then usually output to a pressure comparator to determine the velocity pressure which is the difference between the total pressure and the static pressure.

As shown in FIGS. 6 through 8 and 11, the present invention is illustrated using a pair of parallel plate pitots which substantially span the cross-section of the conduit. They are offset from each other relative to the direction of fluid flow and are oriented at 90 degree angles to one another in order to obtain average velocity measurements in each quadrant of the conduit. It is important to position the respective parallel plate pitots in close proximity to one another in order to obtain as accurate as possible a measurement of velocity across a cross-section of the conduit. The operation is identical to the single parallel plate pitot deployed as above, but that the respective outputs are combined with a tubing manifold, which is of a diameter that does not incur any pressure loss of the measurement. The manifold then averages the respective outputs before they get to the pressure measuring device, such as a pressure transmitter which is well known to those skilled in the art. Other methods may also be employed to convert the output pressures.

Figure 11:
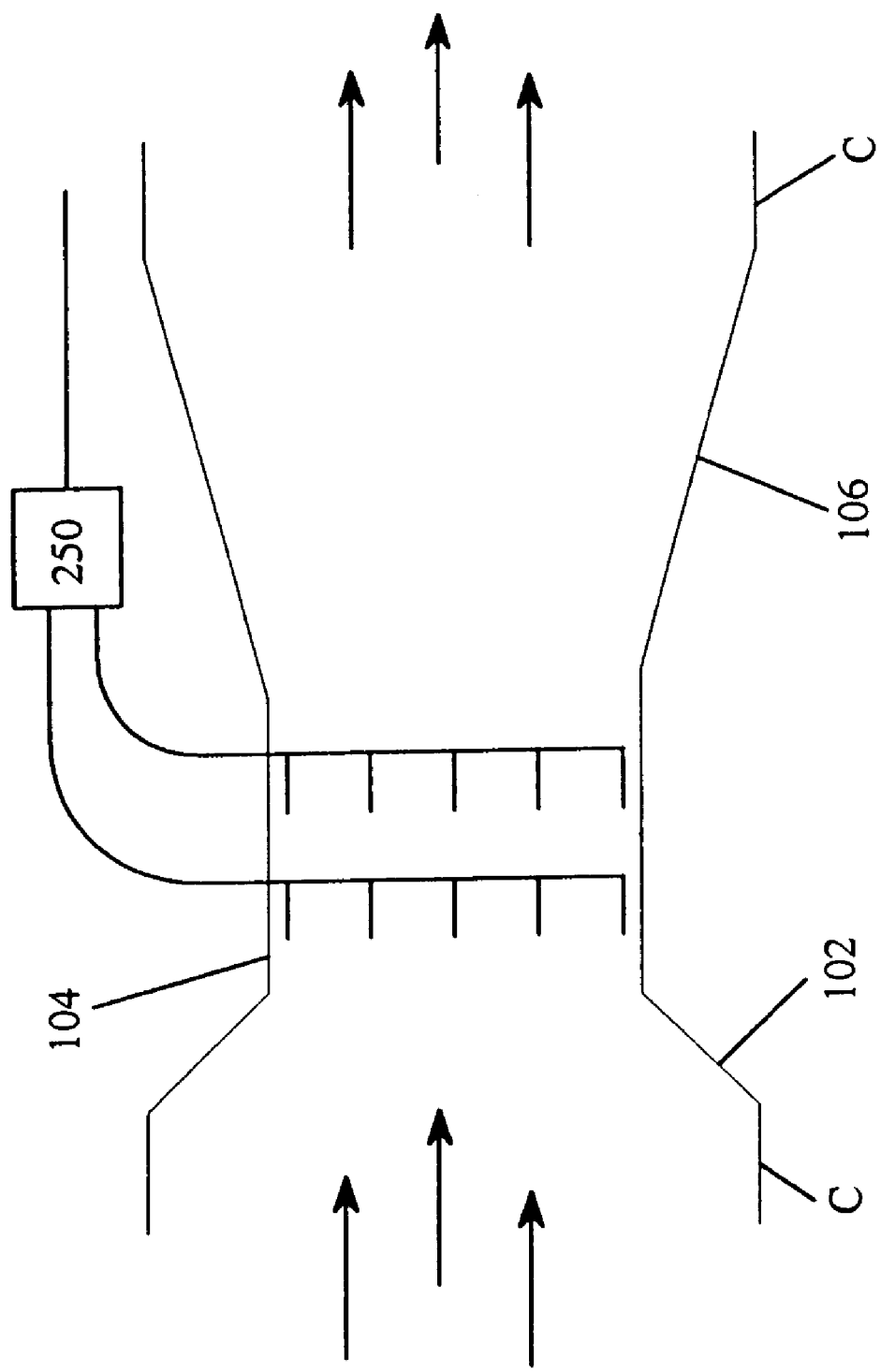
FIG. 11 is a cross-sectional view of a venturi according to the present invention and illustrating the use of a pair of parallel plate pitots to measure fluid velocity and a device to average the respective output signals.
Figure 12:
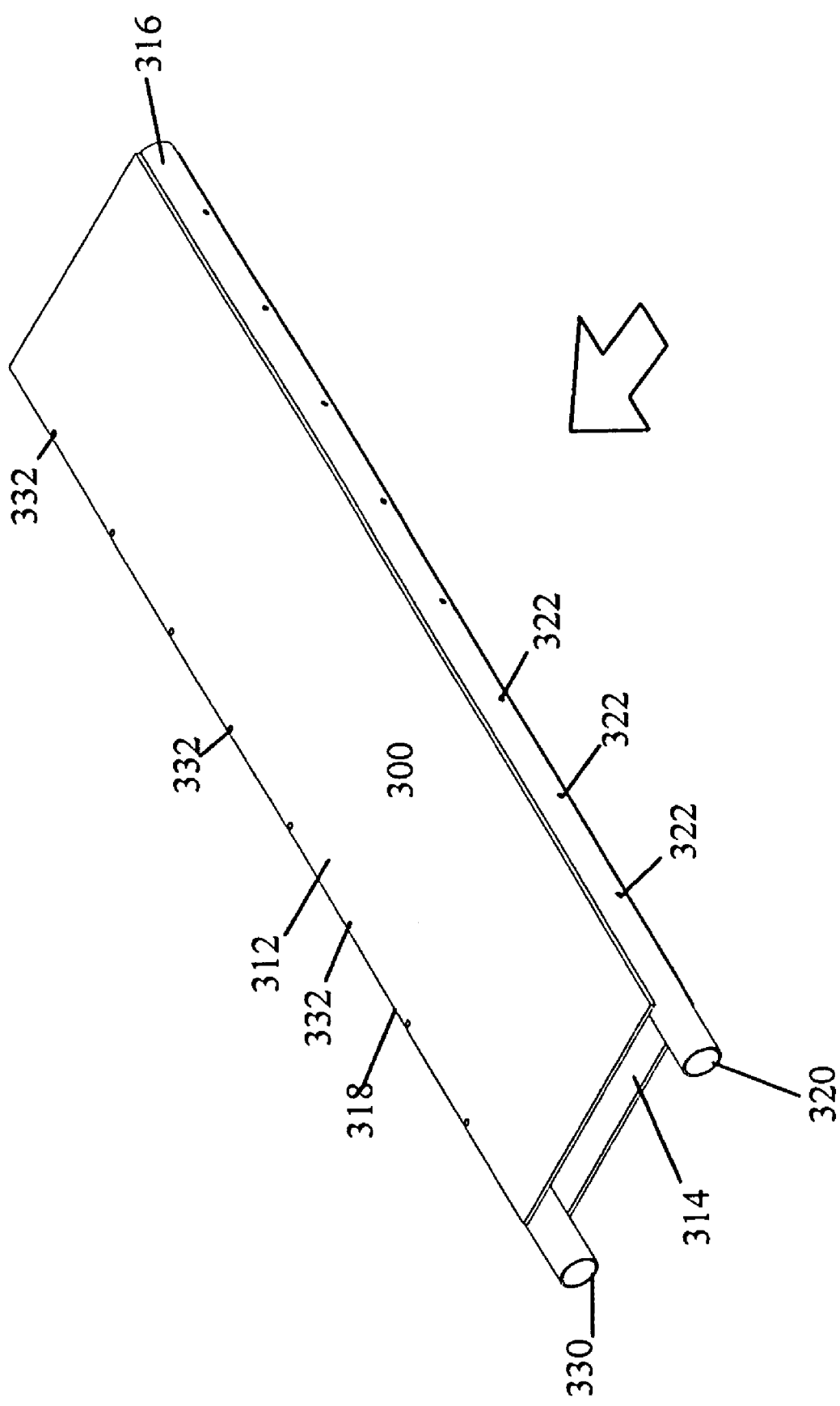
FIG. 12 is a perspective view of a pitot according to the present invention.

With reference to the other velocity averaging devices as shown in FIG. 10, also provided is a means for averaging their output signals in order to determine the average velocity across the conduit from which flow rate is calculated. Preferably, as shown in FIG. 11, the means for averaging is located external of the fluid flow.

According to the method of the present invention, a venturi or (high beta nozzle) is located in-line with the conduit. Ideally, the venturi has a Beta ratio of between about 0.9 and about 0.6. The cross-sectional velocity is measured at a plurality of locations in the throat of the venturi, preferably across a cross-section thereof. A variety of devices may be used to obtain a measurement of cross-sectional velocity including pitots, parallel plate pitots, lasers, ultrasonic waves, manometers, and hot wire anemometers. When one or more parallel plate pitots are used, they are positioned in the throat area oriented in a plane substantially perpendicular to the plane of fluid flow. If more than one parallel plate pitot is used, they are located proximate one another and are offset relative to each other.

The pitot(s) output a signal representative of the velocity which may be converted to an electrical signal that is convertible to the fluid flow rate.

As mentioned above, in many cases accurate fluid flow measurement has not been possible with prior technology due to disturbances in fluid flow (such as eddy currents) which are created at turns in the conduit. The present invention now permits accurate fluid flow measurement in locations which were otherwise not possible. This is due particularly to the use of high beta nozzle/venturi. Further, as the beta ratio increases, i.e., the diameter of the nozzle/venturi decreases, the required distance of conduit for flow straightening and consequently accurate measurement decreases. Thus, accurate measurement of fluid flow in very short runs of conduit is attainable according to the present invention placing multiple smaller diameter nozzles/venturis in the fluid flow stream. More specifically, the respective nozzles/venturis are connected in parallel such that the respective inlet ends are connected to the conduit. The respective pitot output signals are then added to obtain a function which can be translated into fluid flow rate.

Figure 20:
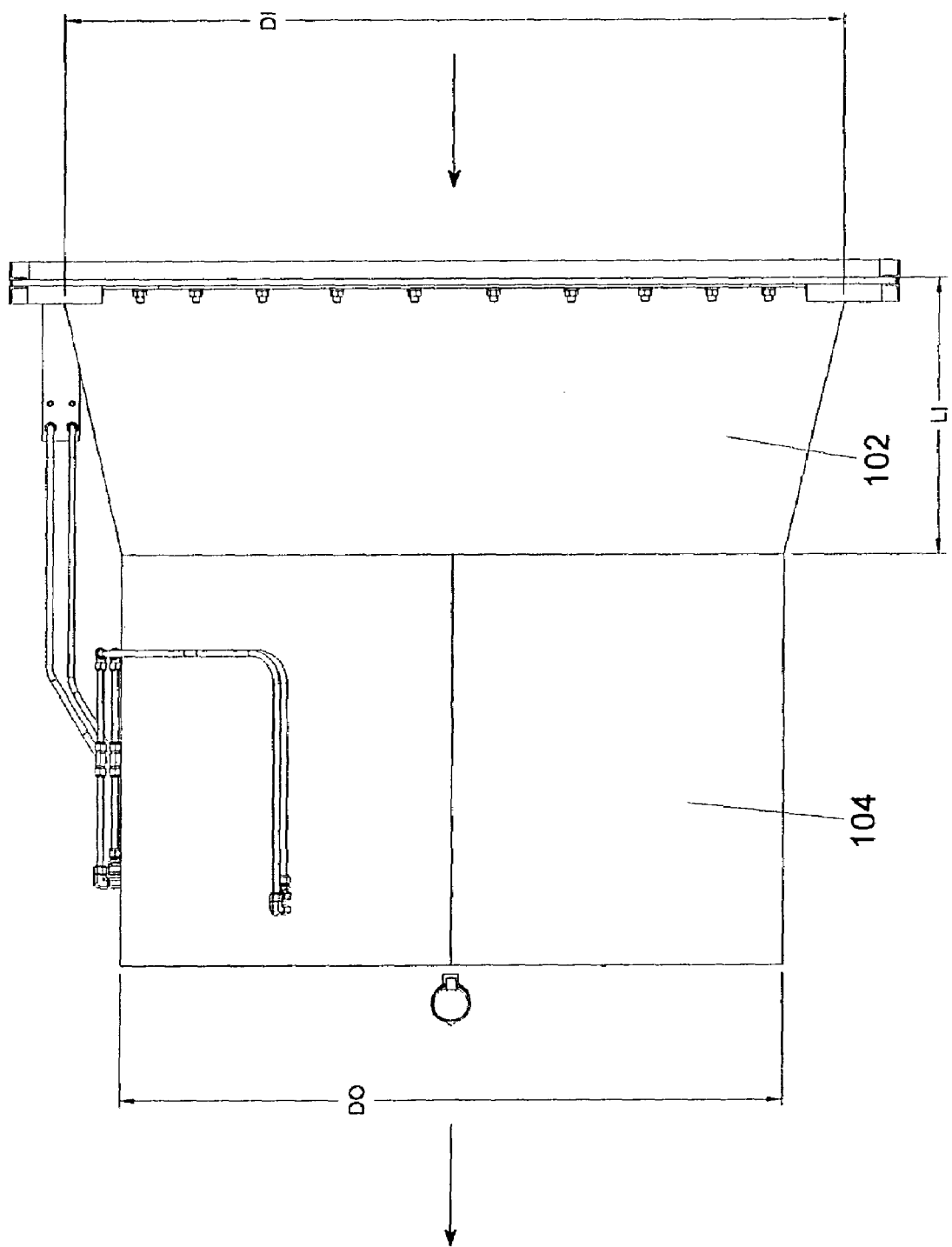
FIG. 20 is a side view of an alternate embodiment of the present invention.
Figure 21:
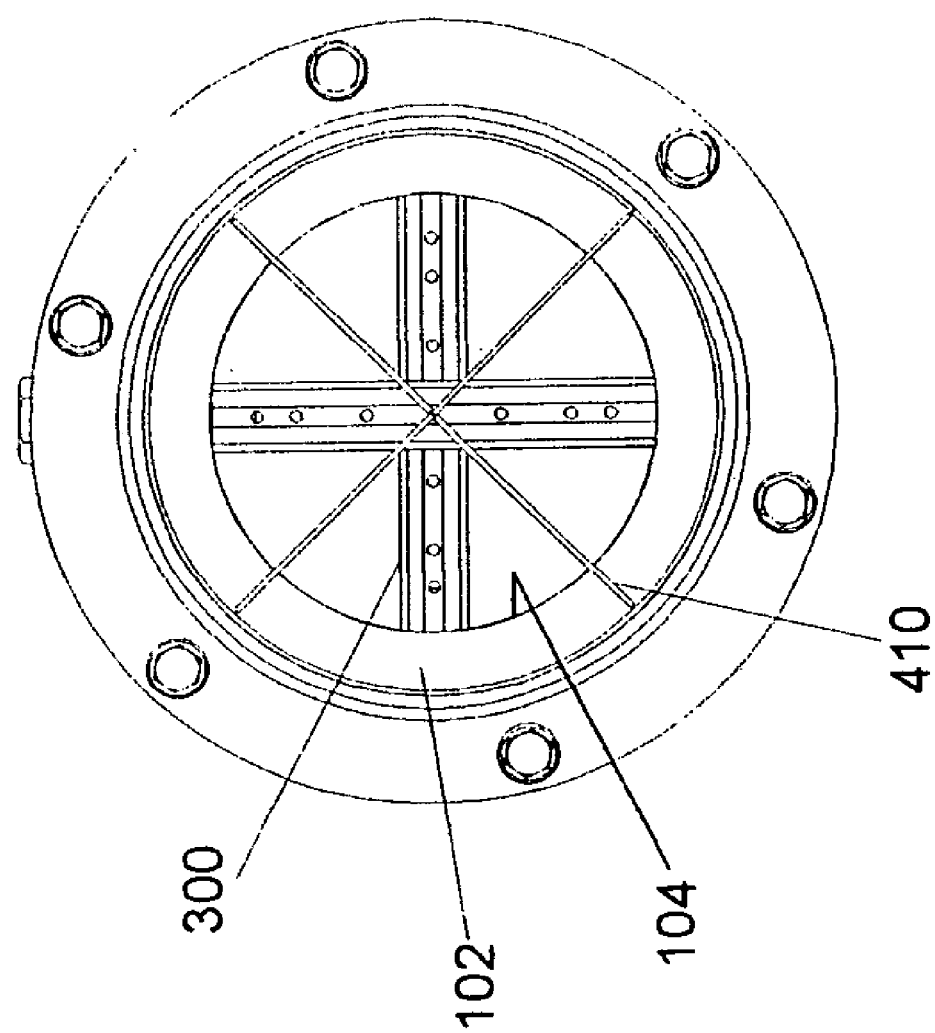
FIG. 21 is a front view of one nozzle according to an alternate embodiment of the present invention.

In another aspect of the invention as shown in FIGS. 18 through 21 additional fluid flow straightening blades 410 are positioned within the converging inlet end. The straightening blades 410 are positioned such that the angle formed between any two adjacent blades is equal (i.e., four blades spaced at 90°; six blades spaced at 60°) and each blade extends across the converging inlet of the nozzle. In addition, they extend substantially the entire length $L_1$ of the of the converging inlet (as shown in FIG. 20). In addition, according to the invention, most cyclonic forces and eddy currents can be eliminated and measurement accuracy enhanced when $L_1$ is between about 0.20 to about 0.50 the length of $D_1$. Optimum measurement accuracy can be obtained if $L_1$ is at least 0.353 $D_1$. For example if $D_1$, is 10 feet in diameter, then $L_1$ should be at least 3.53 feet in length. In order to properly connect the inlet to the constant diameter throat, it will be necessary to vary the angle of the partial cone formed the converging conduit section.

Thus, the foregoing embodiments and examples are to be considered illustrative, rather than restrictive of the invention, and those modifications which come within the meaning and range of equivalence of the claims are to be included therein.

That which is claimed is:

1. An apparatus for measuring fluid flow, the apparatus being adapted to be connected in-line with existing conduit and being characterized by the ability to accurately measure fluid flow with low unrecovered pressure loss and comprising:
    a high beta nozzle adapted to be positioned in-line with the conduit, said high beta nozzle having a converging inlet end connected to the conduit, a throat of substantially constant diameter and terminating in an outlet end, and wherein the length of said inlet end is between about 0.2 and about 0.50 the diameter of the inlet end of said high beta nozzle; and
    a first means for measuring velocity constructed and arranged to measure the velocity at a plurality of locations across the cross-section of the throat and to output a signal representative thereof;
    whereby the fluid flow may be calculated as a function of the velocity measurements.

2. An apparatus according to claim 1 further including a second high beta nozzle adapted to be positioned in-line with the conduit, a second high beta nozzle having a converging inlet end connected to the conduit, a second throat of substantially constant diameter and terminating in a second outlet end, and wherein the length of said second inlet end is between about 0.2 and about 0.50 the diameter of said second inlet end of said second high beta nozzle; and
    a second means for measuring velocity constructed and arranged to measure the velocity at a plurality of locations across the cross-section of the second throat and to output a signal representative thereof; and
    wherein the respective inlet ends are connected to a common fluid flow source;
    whereby by employing multiple high beta nozzles of smaller diameter, accurate measurement of fluid flow may be obtained in short lengths of conduit.

3. An apparatus according to claim 2 wherein said respective means for measuring velocity measures velocity at a plurality of points across the diameter of the conduit and produces an output signal which approximates the average velocity across the conduit.

4. An apparatus according to claim 3 wherein said respective means for measuring velocity is selected from the group consisting of pitots, parallel plate pitots, lasers, ultrasonic waves, manometers and hot wire anemometers.

5. An apparatus according to claim 4 wherein said respective means for measuring velocity comprises a parallel plate pitot and wherein said parallel plate pitot is positioned in the plane substantially perpendicular to the plane of the fluid flow.

6. An apparatus according to claim 5 further including a plurality of parallel plate pitots and wherein the respective parallel plate pitots are offset from each other relative to the direction of fluid flow wherein each of the parallel plate pitots produces a corresponding output signal.

7. An apparatus according to claim 5 further including means for adding the output signals from the respective parallel plate pitots wherefrom the total fluid flow may be calculated.

8. An apparatus according to claim 7 further including a means for averaging the output signals from the respective means for measuring velocity prior to adding said respective output signals.

9. An apparatus according to claim 8 wherein the plurality of output signals from the means for averaging are averaged external of the fluid flow.

10. An apparatus according to claim 1 wherein the high beta nozzle further includes a plurality of blades positioned for minimum resistance in-line with the direction of fluid flow and further wherein said blades extend substantially along the length of said converging inlet end.

11. An apparatus according to claim 10 wherein the length of said inlet end is between about 0.275 and about 0.475 the diameter of the inlet of said high beta nozzle.

12. A method for measuring fluid flow through a conduit and being characterized by the ability to accurately measure fluid flow in short linear conduit lengths with low unrecovered pressure loss and comprising the steps of:

positioning a high beta nozzle in-line with the conduit, the high beta nozzle having a converging inlet end connected to the conduit, a throat of substantially constant diameter and terminating in an outlet end, and wherein the length of the inlet end is between about 0.2 and about 0.50 the diameter of the inlet end of said high beta nozzle;

positioning a plurality of blades in the converging inlet end, the blades being arranged for minimum resistance in-line with the direction of fluid flow and further wherein the blades extend substantially along the length of the converging inlet end; and measuring the velocity at a plurality of locations across the throat of the high beta nozzle;

whereby the fluid flow may be calculated as a function of the velocity measurements.

13. The method according to claim 12 wherein the length of the inlet end is between about 0.275 and about 0.425 the diameter of the inlet end of said high beta nozzle.

14. The method according to claim 12 wherein the length of the inlet end is at least 0.353 the diameter of the inlet end of said high beta nozzle.

15. The method according to claim 14 wherein the step of measuring velocity further includes measuring at a plurality of points across the diameter of the conduit to produce an output signal which approximates the average velocity across the conduit.

16. The method according to claim 15 wherein the velocity is measured using a device selected from the group consisting of pitots, parallel plate pitots, lasers, ultrasonic waves, manometers and hot wire anemometers.

17. The method according to claim 16 wherein the cross-sectional velocity is measured using a plurality of parallel plate pitots positioned in the respective inlet ends and wherein each parallel plate pitot is oriented in a plane substantially perpendicular to the plane of fluid flow and producing a corresponding output signal.

18. The method according to claim 17 further including the step of adding the output signals from the respective parallel plate pitots wherefrom the total fluid flow may be calculated.

19. The method according to claim 18 further the step of averaging the output signals from the respective means for measuring velocity prior to adding said respective output signals.

20. An apparatus for measuring fluid flow, the apparatus being adapted to be connected in-line with existing conduit and being characterized by the ability to accurately measure fluid flow with low unrecovered pressure loss and comprising:

a plurality of high beta nozzles adapted to be positioned in-line with the conduit, each of said high beta nozzles having a converging inlet end, the respective inlet ends are connected to the conduit, a throat of substantially constant diameter and terminating in an outlet end, and wherein the length of each of said inlet ends is at least 0.353 the diameter of the inlet end of each of said high beta nozzles;

a plurality of blades positioned in each of the respective inlet ends for minimum resistance in-line with the direction of fluid flow and further wherein said blades extend substantially along the length of each of said converging inlet ends; and a means for measuring fluid velocity constructed and arranged to measure the velocity at a plurality of locations across the cross-section of each of the respective throats of the respective high beta nozzles and to output a signal representative thereof;

whereby the, fluid flow may be calculated as a function of the velocity measurements.

* * * * *